United States Patent [19]
Kalteis et al.

[11] Patent Number: 5,270,732
[45] Date of Patent: Dec. 14, 1993

[54] CHART RECORDER

[75] Inventors: Helmut Kalteis, Marktoberdorf; Dieter Schmidt, Nesselwang, both of Fed. Rep. of Germany

[73] Assignee: Endress + Hauser Wetzer GmbH + Co. KG, Fed. Rep. of Germany

[21] Appl. No.: 673,017

[22] Filed: Mar. 21, 1991

[30] Foreign Application Priority Data

Apr. 12, 1990 [EP] European Pat. Off. ....... 90 810296.5

[51] Int. Cl.$^5$ ............................................. G01D 9/02
[52] U.S. Cl. ..................................... 346/46; 346/34; 346/76 R
[58] Field of Search ................ 346/34, 35, 44, 46, 346/49, 50, 76 PH, 76 R, 76

[56] References Cited

U.S. PATENT DOCUMENTS

| | | | |
|---|---|---|---|
| 3,576,582 | 4/1971 | Smith | 346/34 |
| 3,596,284 | 7/1971 | Zaphiropoulos | 346/46 X |
| 3,971,041 | 7/1976 | Mason | 346/76 R |
| 4,067,017 | 1/1978 | Dertouzos | 346/46 |
| 4,249,186 | 2/1981 | Edwards | 346/35 |
| 4,382,262 | 5/1983 | Savit | 346/46 X |
| 4,405,931 | 9/1983 | Fujisawa | 346/139 R |
| 4,433,338 | 2/1984 | Nakagawa et al. | 346/34 |
| 4,583,100 | 4/1986 | Tazaki | 346/46 |
| 4,774,524 | 9/1988 | Warbus et al. | 346/44 |

FOREIGN PATENT DOCUMENTS

| | | |
|---|---|---|
| 206194 | 11/1959 | Austria . |
| 2908307 | 9/1980 | Fed. Rep. of Germany . |
| 3004541 | 8/1981 | Fed. Rep. of Germany . |
| 3200238 | 9/1982 | Fed. Rep. of Germany . |
| 3112871 | 10/1982 | Fed. Rep. of Germany . |
| 3227589 | 1/1984 | Fed. Rep. of Germany . |
| 56-147010 | 11/1981 | Japan . |
| 57-118113 | 7/1982 | Japan . |
| 57-169616 | 10/1982 | Japan . |

Primary Examiner—Joseph W. Hartary
Attorney, Agent, or Firm—Barnes & Thornburg

[57] ABSTRACT

A chart recorder is disclosed which has n (n=1, 2, 3, ...) measuring channels, one for each of n measurement signals to be recorded, a printing device (5) which produces n isochromatic dot sequences (8) as curves each associated with one of the n measurement signals on a recording medium (4) moving past it, and 1 to n writing devices (9) for 1 to n different colors which overwrite or underwrite one or more of the dot sequences (8), at least in sections, with a continuous line (10) of another one of the n colors which follows the measurement signal of the respective channel, or a color-printing device (15) for 1 to n different colors which marks selected dots of each curve with dots (18) of another one of the n colors. Thus, the n dot sequences (8) are clearly distinguishable one from the other, particularly at curve intersections, and additional functions, such as alarm markings, can be realized.

20 Claims, 3 Drawing Sheets

CHART RECORDER

The present invention, according to the wording of claim 1, consists in a chart recorder having n (n=1, 2, 3, ...) measuring channels, one for each of n measurement signals to be recorded, a printing device which produces n isochromatic dot sequences as curves each associated with one of the n measurement signals on a recording medium moving past it, and 1 to n writing devices for 1 to n different colors which overwrite or underwrite one or more of the dot sequences, at least in sections, with a continuous line of another one of the n colors which follows the measurement signal of the respective channel, or a color-printing device for n different colors which marks selected dots of each curve with dots of another one of the n colors.

The applicant produces and sells a chart recorder under the name of "MEGA-LOG" in which n=1 to 6 measuring channels are provided, one for each of the measurement signals to be recorded. It has a printing device designed as a fixed thermal comb which is activated or electrically energized for short times to produce, on a heat-sensitive recording paper moving past it, 1 to 6 isochromatic, namely black, dot sequences as curves each of which is associated with one of the six measuring signals and whose dots are generally spaced so closely as to appear as a continuous line.

The thermal comb consists of a plurality of point heat sources which are arranged side by side along the paper width and are in constant contact with the paper, and to which a short current pulse is applied for each dot to produce the dot sequence associated with a measuring channel.

To distinguish the dot sequence associated with a single channel from the dot sequences of the other channels, channel numbers, i.e., alphanumeric characters, are produced by means of the thermal comb on the heat-sensitive paper beside the respective dot sequence at regular intervals. The thermal comb further produces one or more channel-associated line patterns for signal assessment and measurement.

The design and use of thermal combs in chart recorders are also described in U.S. Pat. No. 3,971,041.

The applicant also sells a chart recorder under the name of "CHROMA-LOG L" in which three measurement signals can be recorded as continuous color lines on heat-sensitive paper by means of one to three writing devices designed as ink pens for one to three different color. By means of an alphanumeric thermal print head which is movable to and fro across the heat-sensitive paper, additional information, such as date, time of day, measuring range, measured values, unit of measurment, line pattern, etc., is printed on the heat-sensitive paper; the recording of curves of the measurement signal by means of an alphanumeric thermal print head is not provided for, nor is it possible.

The applicant sells a dotted-line recorder under the name of "CHROMA-LOG P" in which six measurement signals can be recorded discontinuously on heat-sensitive paper by means of six ink nibs for six different colors of a color-printing device designed as a print wheel. Here, too, additional information, such as date, time of day, measuring range, measured values, unit of measurement, line pattern, etc., is printed on the heat-sensitive paper by means of an alphanumeric print head movable to and fro across the heat-sensitive paper; the recording of curves of the measurement signals by means of the alphanumeric thermal print head is not provided, nor is it possible.

In so far, the two chart recorders just described, aside from their multichannel design, correspond to the arrangement described in Jap. unexamined Pat. Appl. 56-147010, which has an analog recording head and a digital recording head, i.e., an alphanumeric recording head, which are both movable to and fro transversely to the recording medium. The digital recording head produces only the alphanumeric characters, and the analog recording head only the curve.

Conventional chart recorders which mostly record the measurement signal in color, such as "CHROMA-LOG P" and "CHROMA-LOG L", have the disadvantage that the supply of colored material for the ink pens or nibs may run out without this being noticed, so that the curves may have considerable gaps. This, however, is not acceptable, particularly in applications where the recorder serves to signal hazardous conditions.

According to one variant of the invention, this disadvantage can be eliminated by underwriting (to another side) or overwriting (to one side) the dot sequence or colored line, at least in sections, with a continous line which follows the measurement signal of the respective channel. This is accomplished by means of the printing device provided in addition to the mechanical writing device. This printing device, unlike in the recording modes of the measurement signals used in the above-explained chart recorders "CHROMA-LOG L" and "CHROMA-LOG P", is driven by the measurement signal in the same way as the writing device.

The invention also makes it possible to eliminate disadvantages associated with the conventional dotted-line recorders, described, such as the "CHROMA-LOG P". These dotted-line recorders, which generally record the measurement signal by means of moving writing devices, produce on the record medium a sequence of more or less closely spaced dots as a function of the measurement signal, which, when viewed as a whole, give the curve. The dot density is dependent not only on the velocity of movement of the recording medium but also on the number of dots produced per unit of time. Since the velocity of movement is chosen so that curve details can be discerned, the dots may be spaced so far apart that reliable completion of the curve by the viewer is no longer possible. Furthermore, the possibility that such a short-time measurement-signal change has occured between two dots that it is not recorded cannot be ruled out.

One advantage of the invention over the "MEGA-LOG" recorder is that the dot sequences of the measurement signals, produced isochromatically by the printing device in the form of a thermal comb, can be overwritten, at least in sections, with a particular colored material instead of being only marked by means of alphanumeric characters. The above-explained running out of the colored material is now irrelevant, since the curves are produced by the printing device without interruption.

Another advantage of the invention over the "CHROMA-LOG L" and "CHROMA-LOG P" recorders is that the ink pens or nibs need not record the measurement signals constantly, i.e., they no longer produce the (main) curves, but that the printing device in the form of, e.g., the thermal comb now records both the alphanumeric characters etc. and the measurement signals, so that it is irrelevant when or if the colored material of the ink pens or nibs run out.

If the chart recorder according to the invention has not only one measuring channel as in its simplest implementation, but two or more measuring channels, further advantages result. If the recorder has two or more measuring channels, the dot sequences—depending on the amplitudes of the measurement signals to be recorded—may come so close to each other as to touch or even intersect, so that, particularly in the case of intersections at very small angles, it may become very difficult for the viewer to decide which of the dot sequences lying before and behind the point of contact or intersection belong together, i.e., form the curve of a particular measurement signal.

By the different-colored, at least partial line marking according to the invention, the association of a curve with the measurement signal of a particular measuring channel is clearly discernible.

Another advantage of the use of the dot-sequence-producing printing device together with the one or more writing devices is that by means of that of the two devices which has the lower mechanical cutoff frequency, a high-frequency-filtered curve can be superimposed on the unfiltered curve. This makes it possible to utilize the property of a low cutoff frequency, which may be disadvantageous particularly in indirect continuous-line recording instruments, for recording the filtered measurement signal simultaneously with the unfiltered measurement signal.

According to the second variant of the invention, the distinguishability of intersecting dot sequences can also be achieved by marking selected points of the individual curves with color dots by means of a color-printing device, in which case the colors assigned to the individual curves are different from each other.

According to a modification of the invention, at least one of the n ink nibs of the color-printing devices or at least one of the n writing devices may be driven by an additional measurement signal to be recorded, so that not only n, but at least n+1 measurement signals can be recorded.

If, according to a preferred embodiment of this modification, the additional measurement signal is derived from one of the n measurement signals by an unambiguous transforming operation, interesting parts of a dot sequence can be set off, e.g., shown enlarged; the transforming operation in this case is a multiplication by a constant factor. Other mathematical transformations, such as squaring, root extraction, differentiation, integration, forming the difference with another one of the n measurement signals, etc., are also possible. This makes it possible, for example, to represent, and facilitate the analysis of, the input and output quantities of a process or a control process.

In the figures of the accompanying drawings, which will now be explained, only the mechanical design of chart recorders in accordance with the invention is illustrated in partly schematic perspective views of different embodiments. The electrical and electronic design of the measuring channels can be of a conventional kind, e.g., of the kind found in the recorders referred to above.

Figure 4:
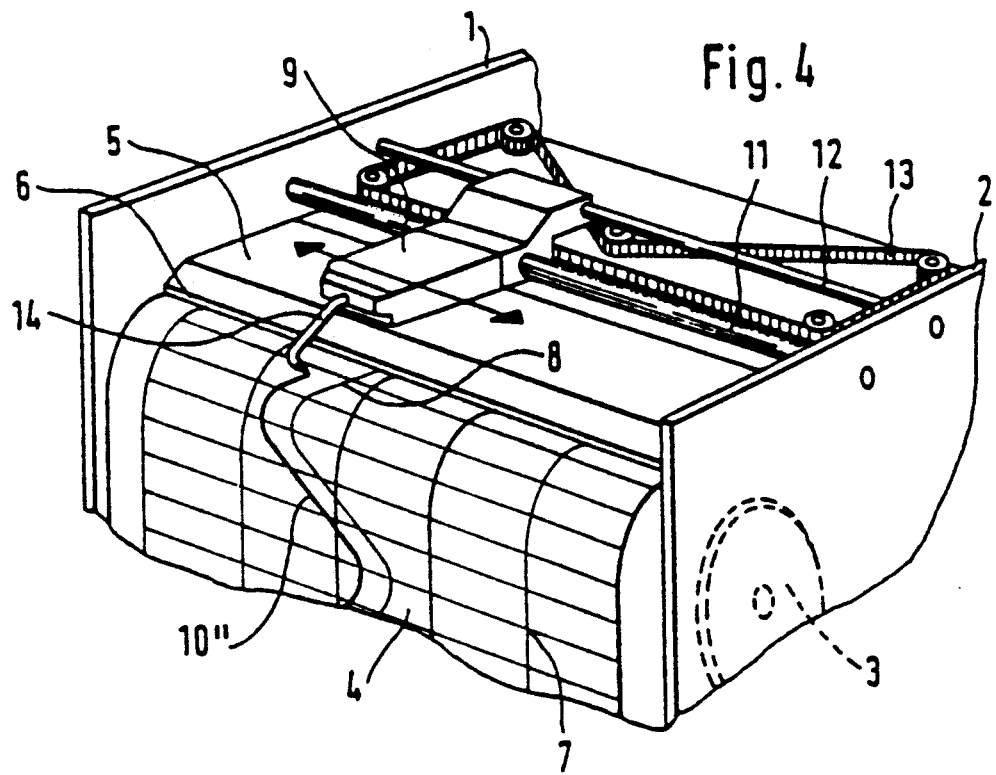
FIG. 4 shows a modification of the arrangement of FIGS. 1 to 3.

In the figures, like parts are designated by like reference characters, and for ease of illustration, except in FIG. 4, the use of the invention for recording a single measurement signal is shown, i.e., the above-mentioned serial number n it 1. Furthermore, only those parts of the chart recorder are shown which are essential for the invention and a thorough understanding thereof.

Figure 1:
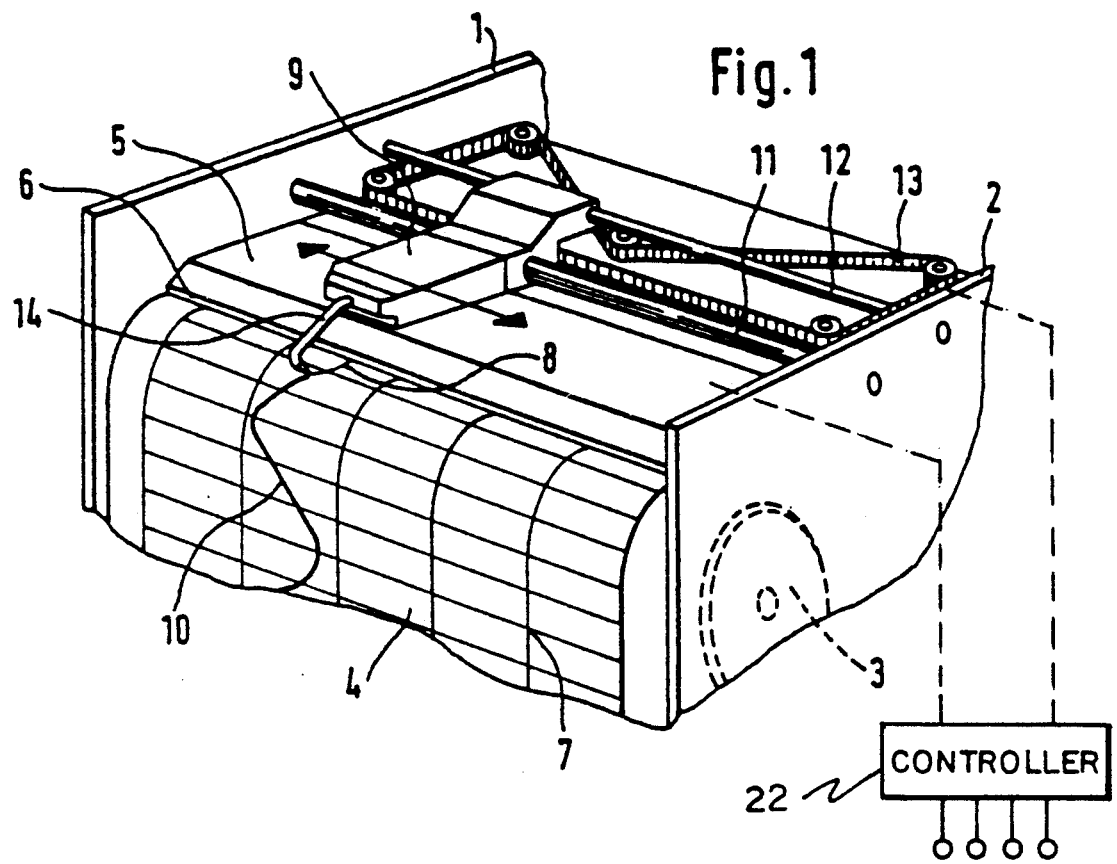
FIGS. 1 to 3 shows the first variant of the invention, using a printing device and an additional writing device, and different recordings that can be made therewith.

The chart recorder of FIG. 1 has two end plates 1, 2, between which the other parts are disposed and which also serve to support and hold these parts. The latter include a print roller 3, via which a recording medium 4 in the form of a thermally sensitive paper is pulled; to this end, the print roller 3 may rotate, for example. Mounted above the print roller 3 is a printing device 5 in the form of a thermal comb of the kind mentioned above, whose closely spaced point heat sources 6 are shown in the figures as a continuous black line.

The printing device 5 produces on the recording medium 4 both a regular pattern of lines 7 and, in response to a measurement signal from a controller 22, a dot sequence 8, whose dots are spaced so closely in FIG. 1 that they appear as a continuous line. The dot sequence 8 is overwritten by means of a writing device 9, which is also driven by the measurement signal from a controller 22. This gives a recording line 10.

The writing device 9 is movable over the entire width of the recording medium 4, as is indicated by the horizontal double-headed arrow, and guided by means of two bars 11, 12. The horizontal drive is effected via a timing beat 13, which passes over the toothed rollers shown, at least one of which is motor-driven. Sliding over the record medium is a pen 14, which is connected with an ink supply, so that the line 10 overwriting the dot sequence interconnects the dots.

Figure 2:
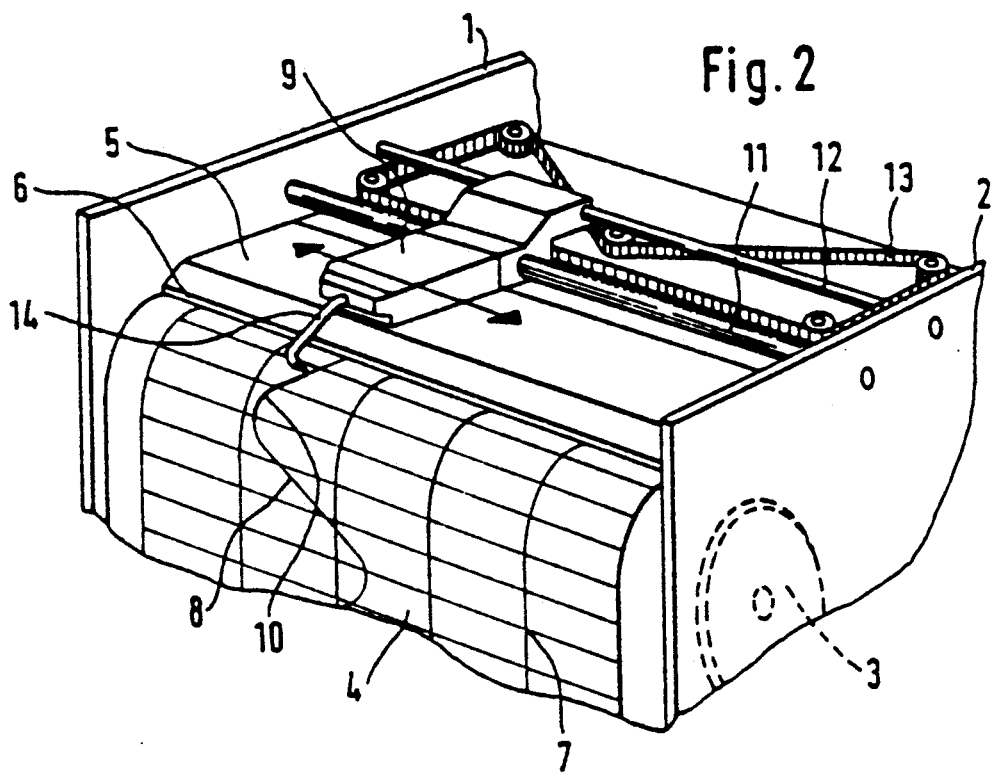

FIG. 2 shows that it is also possible to overwrite only sections of the dot sequence 8 with the line 10. This will be done only, for example, if particularly interesting portions of the curve are to be or have to be marked, particularly if limiting values are exceeded. The marking in sections thus may preferably serve to signal an alarm condition.

Figure 3:
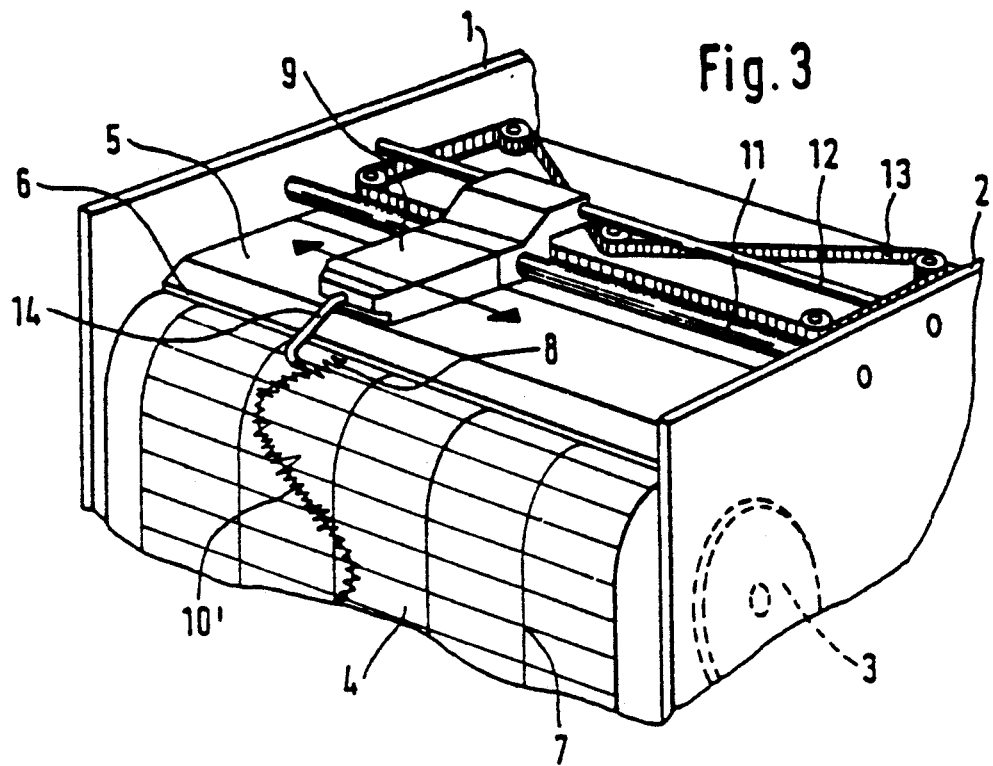

FIG. 3 shows how and that by means of the overwriting line 10' a recording is produced which is free from higher-frequency components which are contained in the measurement signal and, hence, in the dot sequence 8. Because of the inertia of the writing device 9 and/or because of (additional) electric or calculated filtering in the drive circuit for this device, the higher-frequency signal components are not contained in the line 10' drawn by the pen.

FIG. 4 shows that, according to the above-mentioned modification of the invention, the writing device 9, instead of being driven by the measurement signal associated with the dot sequence 8, may also record an additional measurement signal. In the preferred embodiment of this modification shown in FIG. 4, a signal derived from the measurement signal associated with the dot sequence 8 by a transforming operation—in this case a simple constant multiplication—is represented as a recording line 10".

If more than one measurement signal are to be recorded with the arrangements of FIGS. 1 to 4, i.e., if multichannel chart recorders are to be implemented according to the principle underlying the invention, one writing device 9 must be provided for each measuring channel, and these writing devices must be designed in the areas of the pens 14 in such a way as not to hamper each other, i.e., as to be movable past each other one above or below the other, as is also the case in the above-mentioned chart recorder "CHROMA-LOG L".

Figure 5:
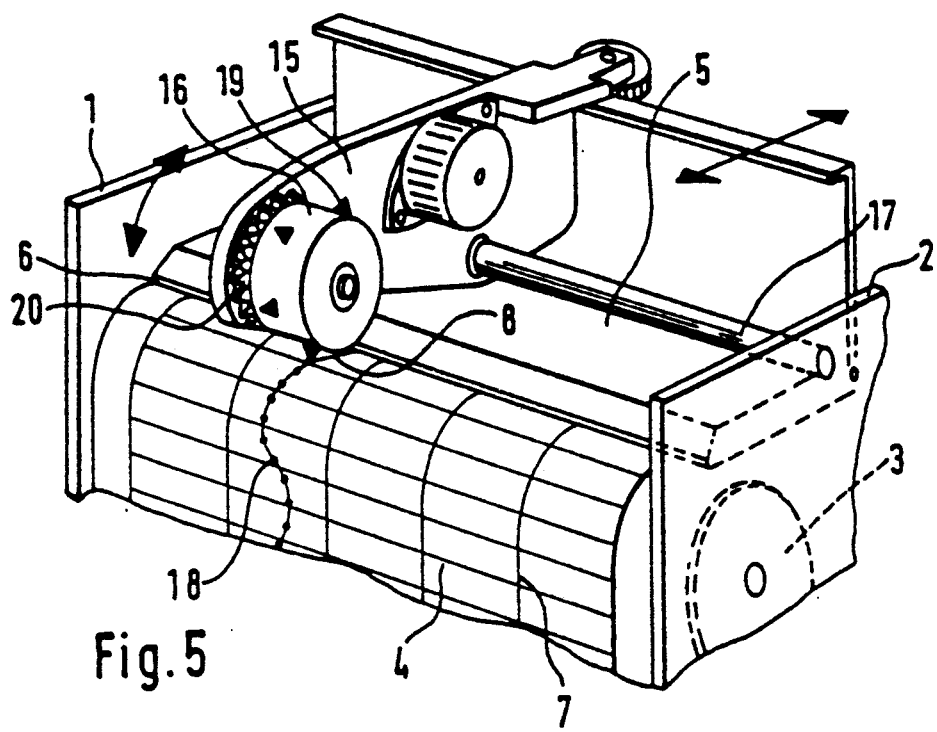
FIGS. 5 and 6 show the second variant of the invention, using a printing device and an additional color-printing device and different recordings that can be made therewith.

The chart recorder of FIG. 5 shows the other variant of the invention. Instead of the writing device 9 of FIGS. 1 to 4, a color-printing device 15 is provided. It comprises a print wheel 16 and is rotatably mounted on and movable along the shaft 17. By backward and forward movement, the print wheel 16 can be positioned and then placed on and lifted from the record medium 4, so that the dot sequence 8, which is again produced by the point heat sources 6 of the printing device 5, can be marked with color dots 18.

The lateral surface of the print wheel 16 is provided with n ink nibs 19 each of which gives off a color different from those of the others. The print wheel 16 further has a gear rim 20, via which the respective ink nibs 19 can be brought to a position in which the color dots 18 are printed on the record medium 4. In FIG. 5, this is the position in which one of the ink nibs 19 is vertically above (directly atop) the record medium 4.

Figure 6:
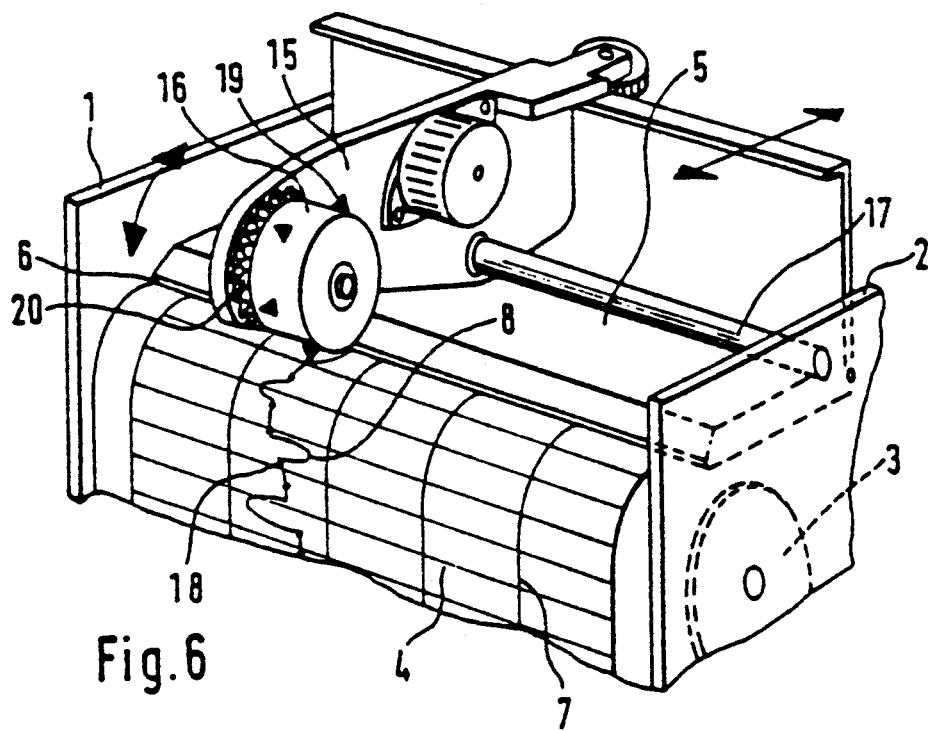

While FIG. 5 shows a mode of operation comparable to the complete overwriting of the dot sequence 8 in FIG. 1—a continuous sequence of color dots 18 is printed—, FIG. 6 shows a mode which is comparable to that explained with the aid of FIG. 3. In FIG. 6, however, the connecting line is the dot sequence 8 itself, which follows the measurement signal faster than the recording by the color dots 18, which represent only the low-frequency components of the measurement signal; the functions of the printing device 5 and the color-printing device 15 are thus interchanged from FIG. 5, because in general the mechanical cutoff frequency of the color-printing device 15 is lower than that of the printing device 5, particularly if the latter is the above-mentioned thermal comb.

We claim:

1. A chart recorder comprising
n measuring channels, one for each of n measurement signals to be recorded,
a moveable recording medium,
means to move the recording medium,
a printing device for receiving an input for each of the n measuring signals for the n measuring channels and which produces n dot sequences as curves on the recording medium, as the recording medium is moved past said printing device by said moving means, each of said dot sequences being associated with one of the n measurement signals, and
1 to n writing devices for writing on said moveable recording medium any one and each of a writing to one side, to another side and directly atop at least one of the dots on the printing medium made by the printing device in said n dot sequences.

2. The chart recorder of claim 1 wherein the n writing devices include n different colors, at least one of the n colors of the writing device is selected by at least one additional measurement signal to be recorded.

3. The chart recorder of claim 2 wherein the additional measurement signal is derived from one of the n measurement signals by a transforming operation.

4. The chart recorder of claim 1 wherein at least one of the n writing devices is selected by at least one additional measurement signal to be recorded.

5. The chart recorder of claim 4 wherein the additional measurement signal is derived from one of the n measurement signals by a transforming operation.

6. A chart recorder comprising
n (n=1, 2, 3, . . . ) measuring channels, one for each of n measurement signals to be recorded,
a moveable recording medium,
means to move the recording medium,
a printing device for receiving an input for each of the n measuring signals for the n measuring channels and which produces n isochromatic dot sequences as curves each associated with one of the n measurement signals on the recording medium, as the recording medium is moved past said printing device by said moving means, and 1 to n writing devices for 1 to n different colors which can selectively write on said moveable recording medium by writing to one side, to another side and directly atop at least two one or more of the dot sequences on the printing medium made by the printing device with a continuous line of another one of the n colors which follows the measurement signal of the respective channel.

7. The chart recorder of claim 6 wherein at least one of the n colors of the color-printing device is selected by at least one additional measurement signal to be recorded.

8. The chart recorder of claim 7 wherein the additional measurement signal is derived from one of the n measurement signals by a transforming operation.

9. The chart recorder of claim 6 wherein at least one of the n writing devices is selected by at least one additional measurement signal to be recorded.

10. The chart recorder of claim 9 wherein the additional measurement signal is derived from one of the n measurement signals by a transforming operation.

11. A chart recorder comprising
n (n=1, 2, 3, . . . ) measuring channels, one for each of n measurement signals to be recorded,
a moveable recording medium,
means to move the recording medium,
a printing device which for receiving an input for each of the n measuring signals for the n measuring channels and produces visible n isochromatic dot sequences as curves each associated with one of the n measurement signals on a recording medium as the recording medium is moved past said printing device by said moving means, and
a color-printing device for 1 to n different colors which marks directly over-top selected of the visible dots of each curve with dots of another one of the n colors which dots follow the measurement signal of the respective channel on the printing medium made by the printing device.

12. The chart recorder of claim 11 wherein at least one of the n colors of the color-printing device is selected by at least one additional measurement signal to be recorded.

13. The chart recorder of claim 12 wherein the additional measurement signal is derived from one of the n measurement signals by a transforming operation.

14. The chart recorder of claim 11 wherein at least one of the n writing devices is selected by at least one additional measurement signal to be recorded.

15. The chart recorder of claim 14 wherein the additional measurement signal is derived form one of the n measurement signals by a transforming operation.

16. A chart recorder comprising
n (n=1, 2, 3, . . . ) measuring channels, one for each of n measurement signals to be recorded,
a moveable recording medium, means to move the recording medium, a printing device for receiving an input for each of the n measuring signals for the n measuring channels and which produces visible n isochromatic dot sequences as curves each associated with one of the n measurement signals on the recording medium as the recording medium is moved past said printing device by said moving means, and a color-printing device for 1 to n different colors which marks directly over-top selected of the visible dots of at least any one of said dot sequence curves on the printing medium made by the printing device with a continuous line in one of the n colors.

17. The chart recorder of claim 16 wherein at least one of the n colors of the color-printing device is selected by at least one additional measurement signal to be recorded.

18. The chart recorder of claim 17 wherein the additional measurement signal is derived from one of the n measurement signals by a transforming operation.

19. The chart recorder of claim 16 wherein at least one of the n writing devices is selected by at least one additional measurement signal to be recorded.

20. The chart recorder of claim 19 wherein the additional measurement signal is derived from one of the n measurement signals by a transforming operation.

* * * * *